United States Patent
Schwab (12)

(10) Patent No.: US 6,464,952 B1
(45) Date of Patent: *Oct. 15, 2002

(54) SULFUR DIOXIDE ABATEMENT METHOD

(75) Inventor: James J. Schwab, Napa, CA (US)

(73) Assignee: EnviroCare International, Inc., Novato, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,015

(22) Filed: Apr. 20, 1998

(51) Int. Cl.⁷ .................. C01B 17/22; C01B 17/20; B01J 8/00; B01D 50/00; B01D 47/06
(52) U.S. Cl. .............. 423/243.08; 95/224; 261/115; 423/243.01; 423/244.07; 423/244.08; 423/235; 423/239.1
(58) Field of Search ............... 422/111, 168, 422/172, 171, 198, 170, 169; 423/243.01, 243.08, 235, 210, 239.1, 244.07, 244.08; 106/465; 261/115; 95/224

(56) References Cited

U.S. PATENT DOCUMENTS

| | | | |
|---|---|---|---|
| 3,984,217 A | 10/1976 | Huntington | 55/20 |
| 4,208,381 A * | 6/1980 | Isahaya et al. | 423/210 |
| 4,375,450 A | 3/1983 | Katagiri et al. | 422/170 |
| 4,640,825 A * | 2/1987 | Rosenberg | 423/235 |
| 4,666,690 A * | 5/1987 | Sommerlad | 423/243.08 |
| 4,708,855 A * | 11/1987 | Morrison | 423/235 |
| 4,810,478 A * | 3/1989 | Graf | 423/244 |
| 5,165,903 A * | 11/1992 | Hunt et al. | 423/239.1 |
| 5,223,239 A | 6/1993 | Moran et al. | 423/640 |
| 5,246,594 A | 9/1993 | Stegemann et al. | 210/743 |
| 5,275,650 A * | 1/1994 | Mongoin et al. | 106/465 |
| 5,279,646 A | 1/1994 | Schwab | 95/201 |
| 5,284,637 A * | 2/1994 | Merritt et al. | 423/244.07 |
| 5,401,481 A * | 3/1995 | Rochelle et al. | 423/331 |
| 5,433,925 A * | 7/1995 | McCord et al. | 422/168 |
| 5,439,658 A * | 8/1995 | Johnson et al. | 423/243.07 |
| 5,480,624 A * | 1/1996 | Kuivalainen | 423/210 |
| 5,484,471 A | 1/1996 | Schwab | 95/8 |
| 5,665,317 A * | 9/1997 | Laslo | 422/171 |
| 5,676,915 A * | 10/1997 | Iiyama et al. | 423/243.01 |
| 5,759,233 A | 6/1998 | Schwab | 95/8 |
| 5,779,999 A * | 7/1998 | Laslo | 423/210 |
| 5,798,087 A * | 8/1998 | Suda et al. | 423/555 |
| 6,060,030 A * | 5/2000 | Schwab et al. | 423/210 |

OTHER PUBLICATIONS

Kohl, A.. L., Riesenfeld, F. C., Gas Purification, Fourth Ed., 1985.*

Hawks, et al., "A Proactive Approach to Minimizing Opacity from Cement Kilns," 1995 IEEE Cement Industry Technical Conference, pp. 451–463, Jun. 4–9, 1995.

Lewis, "Effective Use of Lime For Flue Gas Desulfurization," National Lime Association Conference Proceedings, pp. 157–166, Sep. 27–28, 1983.

Tassicker, et al., "High–Intensity Ionizer for Improved ESP Performance," *EPRI Journal*, pp. 56–61, Jun./Jul. 1997.

J. T. McKennon, "The Porta Batch Lime Slurry Method," *Innovations and Uses for Lime*, ASTM STP 1135., pp. 32–40, Philadelphia, 1992.

(List continued on next page.)

Primary Examiner—Steven P. Griffin
Assistant Examiner—Jonas N. Strickland
(74) Attorney, Agent, or Firm—Coudert Brothers LLP

(57) ABSTRACT

A pollution control apparatus and method to scrub sulfur dioxide uses a lime slurry consisting of small diameter hydrated lime particles injected into the cooling water of a gas cooling tower. The diameter of the lime slurry particles is selected to be less than about 25 microns so that the lime particles substantially dissolve during the evaporative lifetime of the spray droplets. A preferred embodiment of the pollution control apparatus uses an in-line wet grinder and classifier to produce slurry as required.

17 Claims, 5 Drawing Sheets

OTHER PUBLICATIONS

F. Schwarzkopf, et al. "High Surface Area Hydrate WUEL-FRAsorp—Commercial Production and Application," *Innovation and Uses for Lime*, ASTM STP 1135., pp. 96–111, Philadelphia, 1992.

G. Werner, et al., "ELectrostatic precipitators in cement plants," *International Cement Review*, pp. 61–65, Aug. 1991.

L. Bier, et al., "Construction and operation of a hydrated lime plant for flue gas desulphurization of the Siersdorf power station," Zement–Kalk–Gips, pp. 207–209, Wiesbaden, No. 8, 1992.

"VenturiPak Gas Scrubbing Systems for Wastewater Applications," EnviroCare Systems, Inc., Novato, California, Product Information Brochure, date unknown.

"MicroMist Evaporative Gas Cooling and Conditioning Systems," EnviroCare International, Novato, California, Product Information Brochure, date unknown.

Robert H. Perry, et al., Chemical Engineers HandBook, $5^{th}$ Edition, pp. 8:51–52, 8:13, and 21:41, 1973.

S. H. Sheth, "$SO_2$ Emissions and Scrubbing System," Presentation at $33^{rd}$ IEEE Cement Industry Conference, pp. 191–228, Mexico City, May, 1991.

"MicroMist Engineered Systems, Enhancing Dust Collector Performance," EnviroCare International, Novato, California, Product Information Brochure, date unknown.

Riley, et al., "Re–evaluating evaporative gas conditioning: Is feasibility still an issue?," *International Cement Review*, pp. 36–40, Nov. 1990.

N. Biege, et al., "A Changing Environment," International Cement Review, pp. 73–80, Jul., 1997.

L. Edwards, et al., "Simultaneous In–Plume and In–Stack Sampling for Analysis of A Detached Plume at A Cement Plant," pp. 1–6, *Journal of Atmospheric Sciences*, 1991.

P.V. Bush, "Advantages of Humidification for Pollution Control," American Power Conference, Library of Congress Cat. Crd. No. 39–5827, vol. 57–1, pp. 38–43, 1995.

* cited by examiner

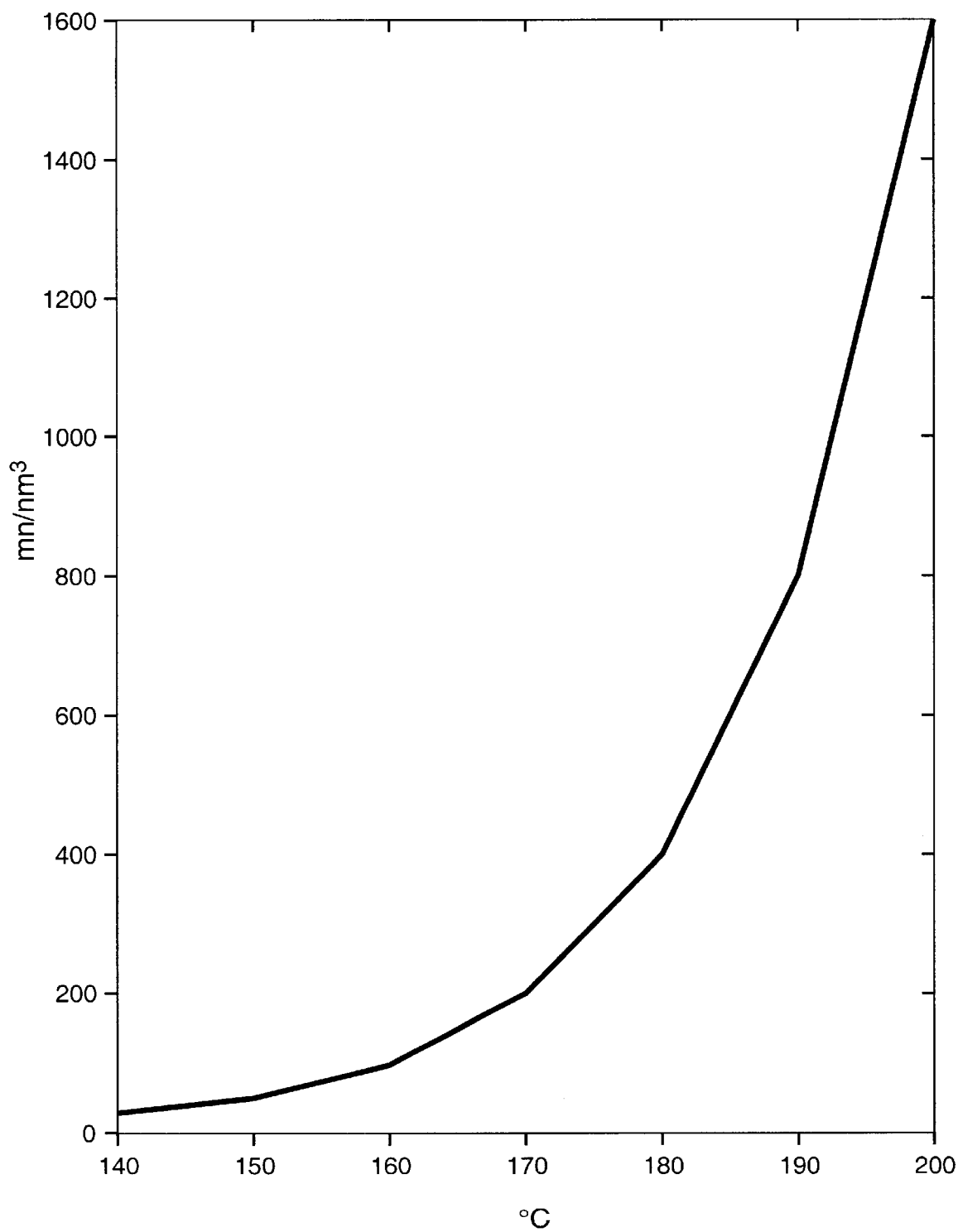
FIG._1

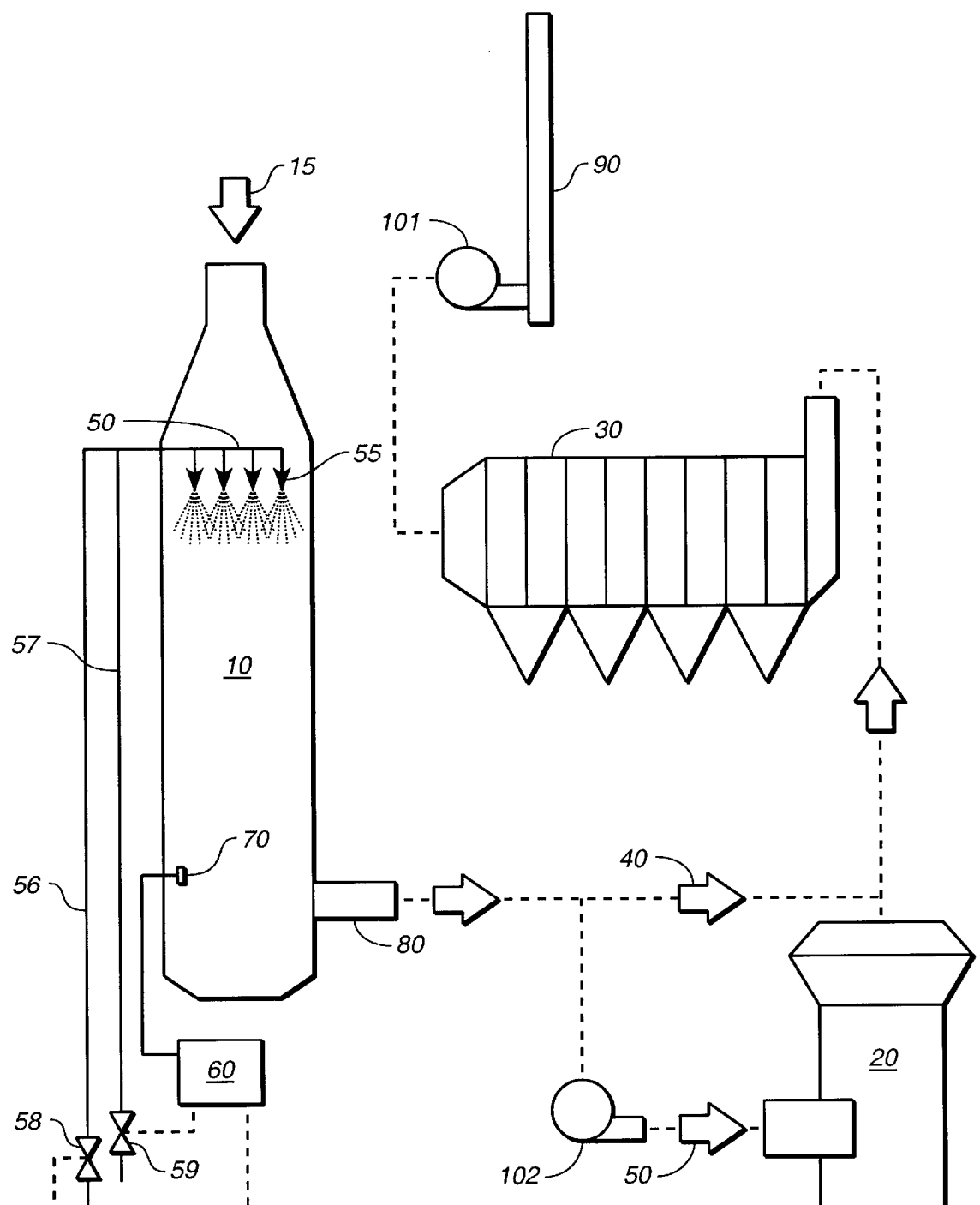
FIG._2
*(PRIOR ART)*

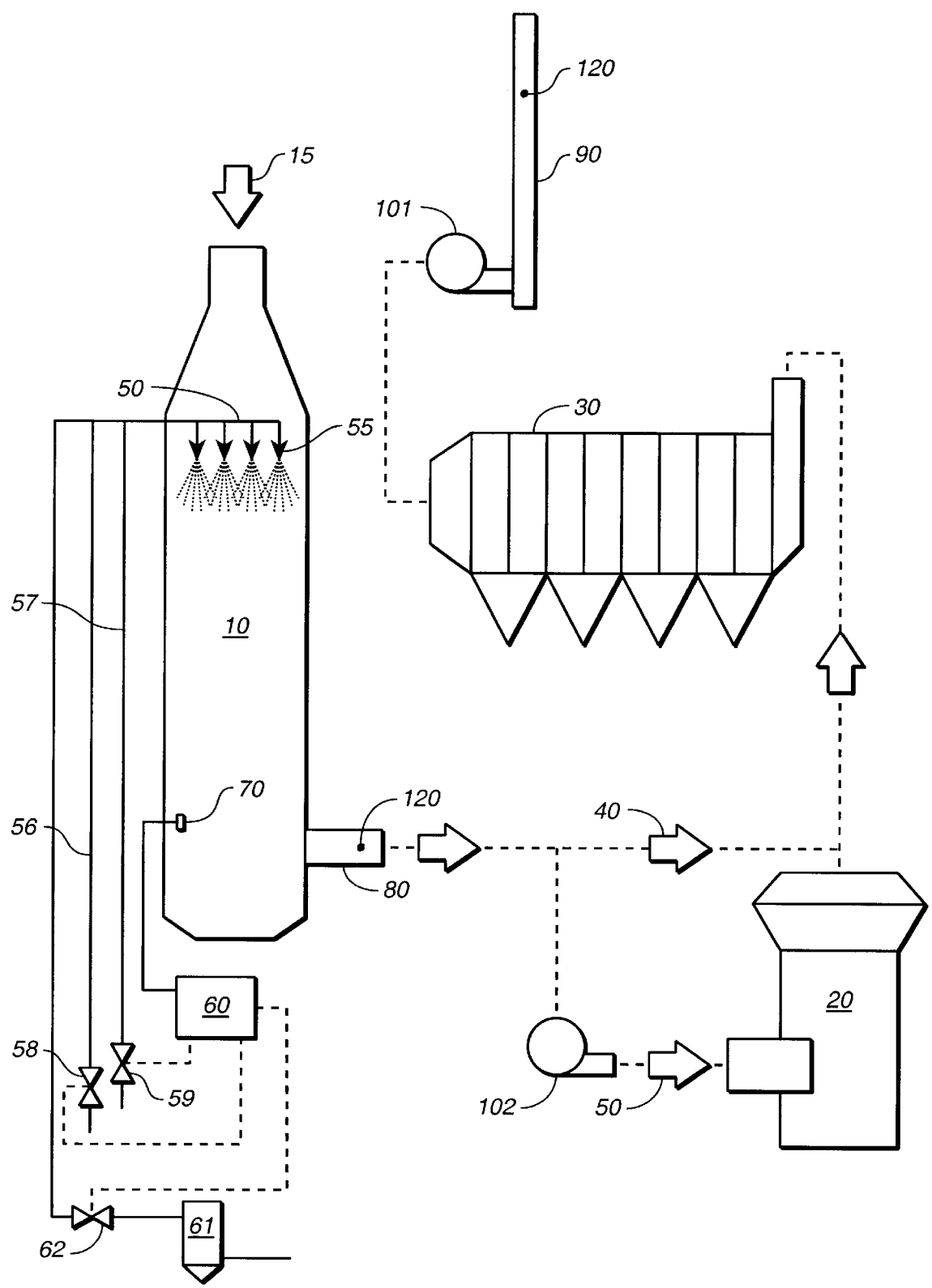
FIG._3

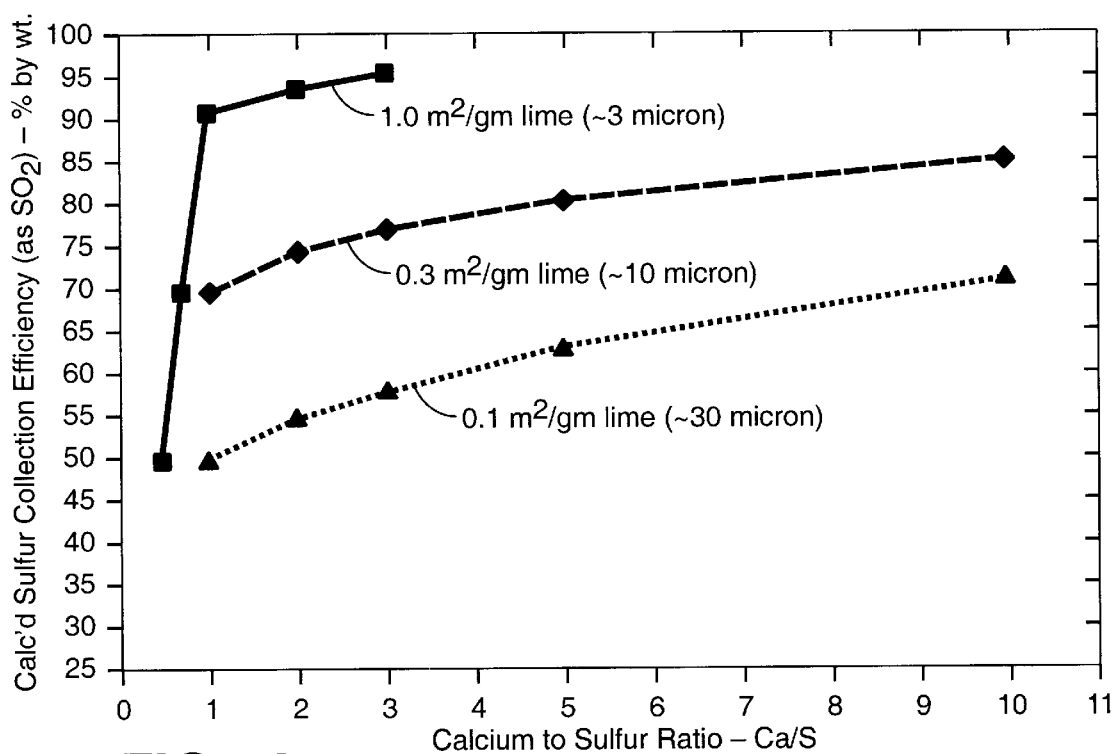
FIG._4
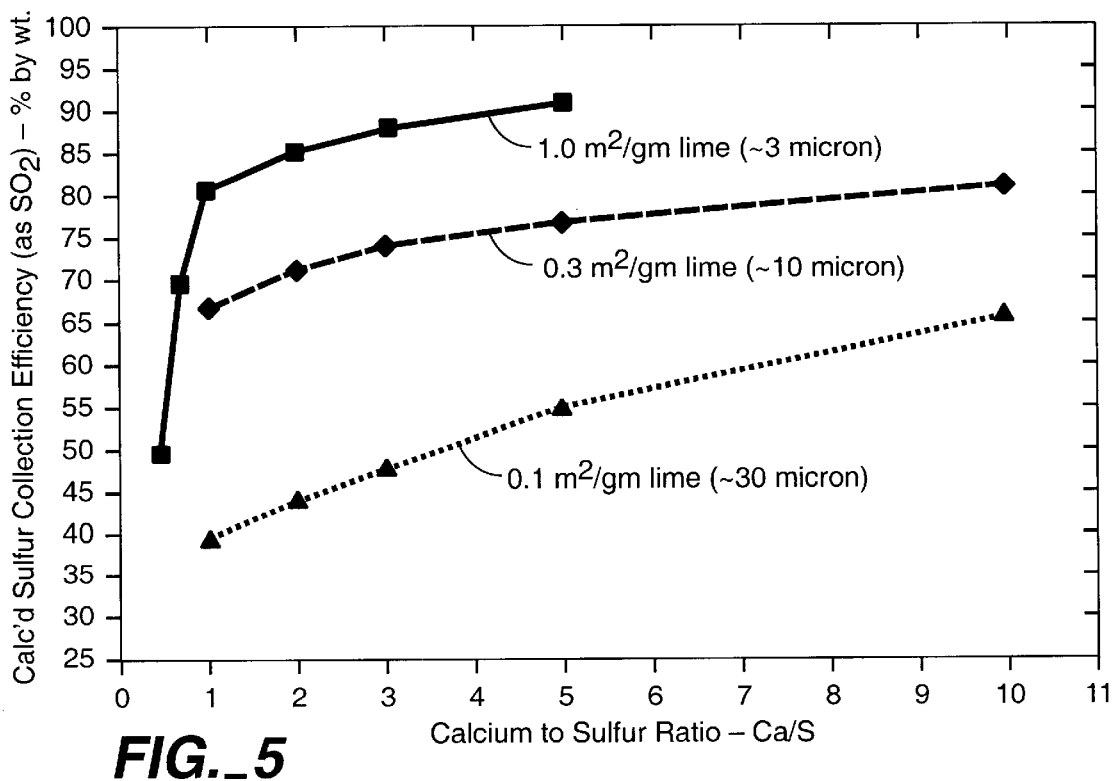
FIG._5

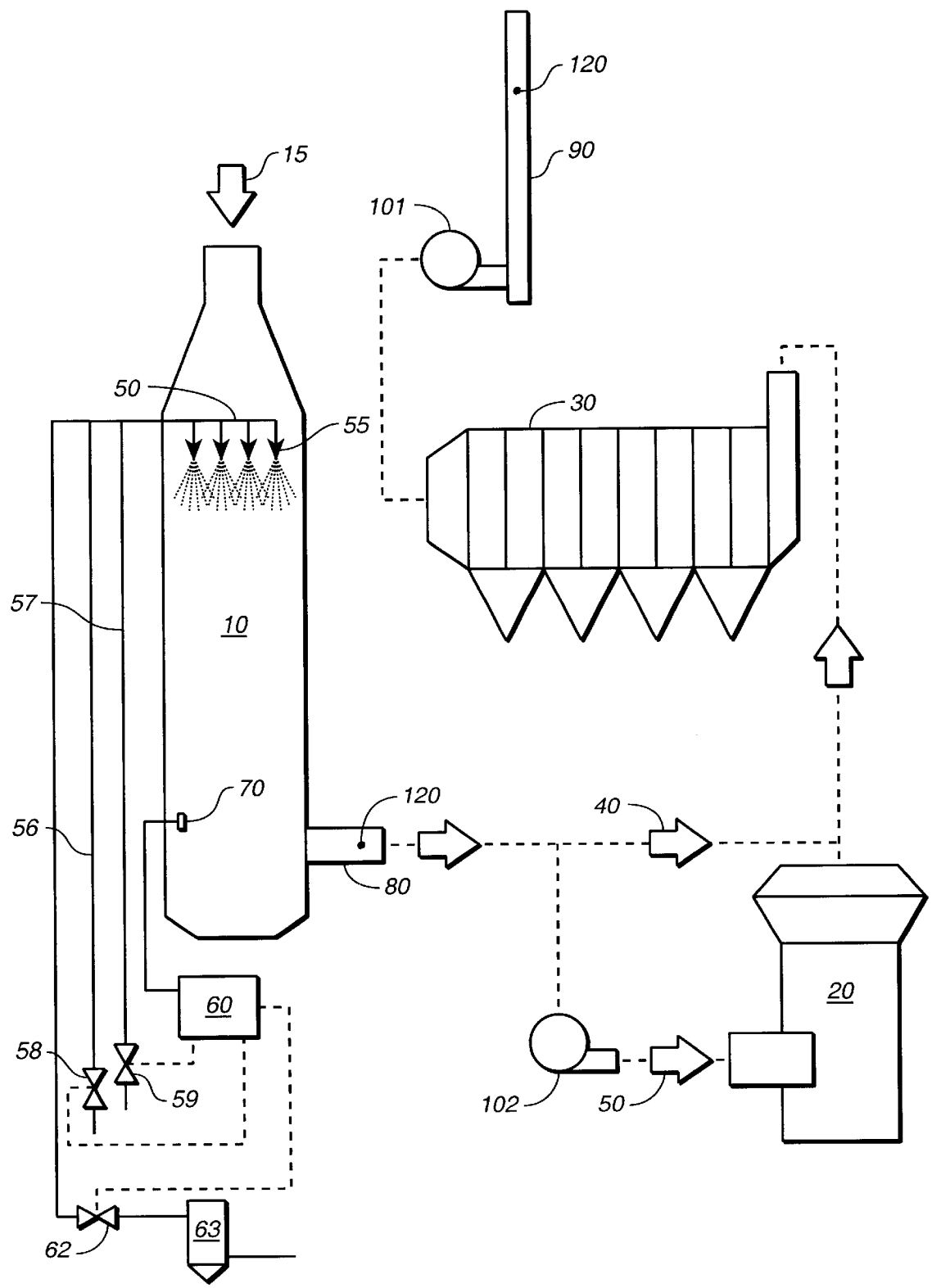
FIG._6

SULFUR DIOXIDE ABATEMENT METHOD

FIELD OF THE INVENTION

This invention relates generally to the field of air pollution control, and is particularly directed to an abatement system to scrub sulfur dioxide and other acid-forming gases from hot industrial gases.

BACKGROUND OF THE INVENTION

Over the past several decades the control of air pollution has become a priority concern of society. The United States and other countries have developed elaborate regulatory programs aimed at requiring factories and other major sources of air pollution to install the best available control technology (BACT) for removing contaminants from gaseous effluent streams released into the atmosphere. The standards for air pollution control are becoming increasingly stringent, so that there is a constant demand for ever more effective pollution control technologies. In addition the operating costs of running pollution control equipment can be substantial, so there is also a constant demand for more energy efficient technologies.

Two well known types of devices to remove common particulates from a gaseous effluent stream are electrostatic precipitators (ESPs) and fabric filter baghouse (FFB) collectors. ESPs are generally recognized as being capable of a high particle collection efficiency of fine particles when the particles have the proper electrical resistivity. FFBs are also generally recognized as being capable of a high particle collection efficiency of fine particles when the particles have the proper characteristics. Typically, pollutant gases are conditioned such that the particulates can be more efficiently filtered by ESPs or FFBs.

However, ESPs and FFBs do not remove many gaseous chemicals. Certain species of acid-forming gases can penetrate conventional particulate collection devices such as ESPs or FFBs resulting in emissions violations, causing downstream corrosion of components, and contributing to visible condensed particles which form typically after exiting the stack. In particular, ESPs and FFBs do not remove sulfur dioxide, hydrogen chloride, or other gases that form acids when dissolved in water.

The acid-forming gases that may be released from an air pollution control system with ESPs or FFBs may violate pollution control standards, may contribute to the "detached plume" phenomena and may contribute to acid rain. Consequently, pollution control systems for applications generating large quantities of acid forming gases, such as coal-fired power plants, often require additional means to scrub acid forming gases from the effluent stream. Other applications where the emission of acid forming gases may be a problem include small coal-fired boilers, municipal waste incinerators, and medical waste incinerators.

Acid forming gases may contribute to the formation of visible plumes of effluent that violate opacity regulations even though the total quantity of acid forming gases released into the atmosphere is comparatively minor. For example, one air pollution control problem for cement plants is the formation of a detached plume. Experimental studies have identified the detached plumes as being comprised primarily of ammonium sulfate and ammonium chloride particulates that form and condense as the emissions from the stack cools in the atmosphere a distance from the stack. The ammonium particulates are in a size range of approximately one micron, which is a size that is efficient at scattering and reflecting light. The small size of the particulates and their high scattering efficiency means that an optically opaque plume can be comprised of a comparatively small total mass of ammonium sulfate and ammonium chloride particulates. These detached plumes consist of a fine white plume that may last for hours or days depending on plant and atmospheric conditions. The plumes are highly noticeable and may violate pollution control regulations for opacity, and are thus a potentially serious problem.

Modern cement plants typically use ESPs or FFBs to reduce particulate emissions. However, these particulate filters do not remove the component chemicals that form detached plumes. In particular, ESPs and FFBs do not capture gaseous sulfur dioxide and gaseous hydrogen chloride which contribute to the chemical reactions that form detached plumes. In principle, an additional chemical scrubber could be added immediately after an ESP or FFB. However, conventional methods to scrub acid forming gases are typically expensive and inconsistent with the economic operation of an energy efficient cement plant. For example, conventional wet scrubbers, which commonly use spray droplet sizes greater than 1000 microns, typically use 10–100 gallons per minute of scrubbing liquid to scrub 1000 standard cubic feet per minute of effluent gases (1–10 kilograms of liquid per kilogram of gas). Consequently, the consumption of water, scrubbing chemicals, and energy is large for conventional liquid scrubbers.

Modern energy efficient cement plants typically use two methods to cool and condition hot process gases before they enter an ESP or FFB. In a first stage of cooling, a gas conditioning tower (GCT) uses a spray of water to cool and condition the gaseous effluent. A second stage of cooling and conditioning is performed by passing the partially-cooled effluent through the cool wet limestone of the feed mill supplying fresh meal to the kiln, when the feed mill is operational.

Typically, the hot cement kiln gases must be cooled to approximately 150° C. to have acceptable emissions from an ESP or cooled to approximately 180° C. to protect a FFB from overheating. When the feed mill is on, the gas conditioning tower typically must only cool the gaseous effluent to around 250° C. In the mill-on state, the effluent is further cooled to between 100° C. to 150° C. as a result of passing through the feed meal. However, when the feed mill is shut off, the cooling tower must provide all of the cooling. There are thus two distinct operational states of the cement plant, corresponding to a mill-on and a mill-off condition.

One attempted solution to the problem of sulfur dioxide emissions from a cement plant is to inject a lime slurry into the spray used to cool the GCT. A lime slurry is a desirable scrubbing material because lime is chemically compatible with other chemical constituents of cement. The cement will not be deleteriously contaminated if small quantities of lime enter the feed meal subsequent to the GCT. The chemicals in the lime slurry react with sulfur dioxide to produce thermally stable salts, thereby reducing sulfur dioxide emissions. However, conventional approaches to injecting a lime slurry into the cooling water of a GCT have low collection efficiencies and consume large quantities of lime slurry (see, e.g., Satish H. Sheth, "$SO_2$ Emissions History and Scrubbing History", pp. 213–217, $33^{rd}$ IEEE Cement Industry Conference, Mexico City, Mexico May 1991). Conventional approaches to reducing sulfur dioxide emissions from cement plants are not consistent with high sulfur dioxide collection efficiencies (e.g., greater than about 50%) with low molar ratios (e.g., less than about 3) of calcium hydroxide to sulfur dioxide. In some applications the maximum achievable sulfur dioxide collection efficiency may be unacceptably low, even at extremely high molar ratios of calcium hydroxide to sulfur dioxide. The large lime consumption required in conventional lime slurry injection schemes increases the operating cost and exacerbates the problems of the clogging and plugging of valves and nozzles. Additionally, the cost of the lime is further increased in conventional lime slurry injection schemes utilizing filtered slaked lime because only a fraction of the slaked lime ends up in the filtered slurry.

There are several factors that have previously made the use of a lime slurry in a GCT spray an inefficient and impractical means to scrub acidic forming gases in conventional pollution control systems used in cement plants. Some of these factors tend to limit the collection efficiency. Generally, the total quantity of spray in a GCT is kept as low as possible to reduce energy costs. This reduces the total volume of spray droplets that can adsorb gases. The evaporative lifetime of spray droplets in a GCT is also short, typically a few seconds, which reduces the time available for gases to be absorbed. Also, the chemical reaction rates of a lime slurry with adsorbed acidic gases may be comparatively slow. In conventional approaches the acid forming gases are not adsorbed and converted into salts in the spray droplets at a fast enough rate to efficiently collect sulfur dioxide using low molar ratios of calcium to sulfur.

There are also other applications, such as small coal-fired boilers, municipal waste incinerators, and medical waste incinerators, where the use of a scrubbing spray comprised of a lime slurry is desirable. Lime is a comparatively safe scrubbing chemical whose chemical components are consistent with many different pollution control systems. However, scrubbing acidic forming gases with a spray containing a lime slurry may also be prohibitively expensive in these applications because of slow reaction dynamics and a low reaction efficiency. The inventors believe that there are numerous potential applications for a scrubbing spray comprised of a lime slurry that are rendered impractical because of the poor collection efficiency and large quantities of lime required using conventional approaches.

What is desired is an apparatus that permits acid forming gases to be efficiently and economically scrubbed using a spray composed of a cooling liquid and a lime slurry.

SUMMARY OF THE INVENTION

The present invention generally comprises an apparatus to create a spray of fine droplets composed of a cooling liquid and a lime slurry. A two-fluid nozzle is used to create spray droplets preferably having a mean diameter less than about 200 microns. A slurry source of finely ground hydrated lime particles with a mean diameter less than about 25 microns is injected into the spray liquid at a controlled rate. Preferably, the mean diameter of the hydrated lime particles is between one to ten microns.

One aspect of the present invention is that an in-line wet grinder may be used as an economical source of slurry having a controllable mean particle diameter. Another aspect of the present invention is that the mean particle diameter may be selected such that the hydrated lime particles rapidly release calcium hydroxide in spray droplets and substantially dissolve during the lifetime of a droplet. Still another aspect of the present invention is that the mean diameter of the spray droplets may be controlled to increase the surface-to-volume ratio of spray droplets, increasing the absorption rate of sulfur dioxide and other acidic forming gases. Yet another aspect of the present invention is that the characteristics of a spray composed of a liquid and lime slurry may be selected to achieve an efficient sulfur dioxide scrubbing function in a gas cooling tower.

BRIEF DESCRIPTION OF THE DRAWINGS

FIG. 1 is a graph showing the relationship between particulate emissions and gas temperature in an electrostatic precipitator used in a modern cement plant.

FIG. 2 is a process flow diagram of a typical modern cement plant showing the air pollution control equipment and raw feed mill.

FIG. 3 is a process flow diagram of the present invention in which additional injectors permit an alkaline earth spray from the nozzles in the gas conditioning tower.

FIG. 4 is a plot of calculated sulfur collection efficiency versus molar ratio of calcium to sulfur for a gas conditioning tower in which the spray droplets have a mean evaporative lifetime of approximately three seconds.

FIG. 5 is a plot of calculated sulfur dioxide collection efficiency versus molar ratio of calcium to sulfur for a gas conditioning tower in which the spray droplets have a mean evaporative lifetime of approximately two seconds.

FIG. 6 is a process flow diagram similar to FIG. 3 but with an in-line grinder to form the slurry.

DETAILED DESCRIPTION OF THE INVENTION

There are many pollution control applications where it is desirable to have a cost efficient means to scrub sulfur dioxide and other acidic-forming gases using a comparatively safe and ecologically friendly scrubbing spray containing hydrated lime. Spray droplets absorb sulfur dioxide and other acid forming gases to form acids in the spray droplets. For example, sulfur dioxide reacts with water and oxygen in spray droplets to produce sulfurous and sulfuric acid. According to the present invention, hydrated lime in spray droplet reacts with sulfuric acid in a droplet to bind up sulfur in the form of a thermally stable calcium sulfate salt according to the reaction: $Ca(OH)_2+H_2SO_4 \rightarrow CaSO_4(s)+2H_2O(l)$. Calcium sulfate is thermally stable at temperatures greater than 1200° C. Similarly, hydrated lime reacts with hydrochloric acid in a droplet to bind up chlorine as a thermally stable calcium chloride salt according to the reaction: $Ca(OH)_2+2HCl(aq) \rightarrow CaCl_2(aq)+2H_2O$. Calcium chloride is thermally stable at temperatures greater than 1600° C.

However, calcium hydroxide has not been commonly used as the primary scrubbing agent in sprays used to scrub sulfur dioxide or hydrogen chloride from gaseous effluents. The cost of using calcium hydroxide as a primary scrubbing agent is prohibitively expensive in many applications because large quantities of water and lime are required to achieve acceptable sulfur dioxide collection rates. In some cases, the large quantities of water and lime are inconsistent with other objectives. For example, a pollution control system that uses large quantities of lime may have problems with clogging and plugging of valves, nozzles, and pipes. Consequently, there are many potential applications where it has been impractical to use hydrated lime as a scrubbing agent to scrub sulfur dioxide and other acidic-forming gases from a gaseous effluent.

The present invention generally comprises an apparatus to economically produce a spray composed of a liquid and a hydrated lime slurry that is efficient at scrubbing acidic-forming gases. In many applications the spray will also serve to cool the gas flow. The usefulness of the present invention is illustrated with reference to the particular problem of controlling the emissions of acidic forming gases from a modern cement plant. However, the teachings of the present invention are generally applicable to other pollution control systems where it is desirable to efficiently scrub acidic forming gases using a spray comprised of comparatively small quantities of water and lime.

Modern cement plants often use electrostatic precipitators (ESPs) to control the emissions of particulates from the plant. ESPs are generally recognized as being capable of a high particle collection efficiency, especially of fine particles when the particles have the proper electrical resistivity (see, e.g., Tassicker and Schwab, "High Intensity Ionizer For Improved ESP Performance, pp. 56–58, EPRI Journal (June/July 1977). The optimum range of dust resistivity in situ is typically between $10^9$ and $10^{11}$ ohm cm. In many industrial applications, the suspended dust particles in the effluent gas streams are not in this range for the gas conditions entering the ESP. Therefore, the dust particles must be conditioned prior to entry into the ESP by changing the gas temperature or increasing the moisture content of the gases or both (see, e.g., G. Werner, "Electrostatic Precipitators In Cement Plants", International Cement Review (August 1991) pp. 61 et seq.; and J. R. Riley and John M. Tate, "Re-evaluating Evaporative Gas Conditioning: Is Feasibility Still An Issue?" International Cement Review (November 1990), pp. 36, et seq.). FIG. 1 is a graph of particulate emissions (mg/nm) from a cement kiln/preheater tower versus the temperature (°C.) of the effluent entering the ESP when the gases are conditioned by the evaporative cooling of water. As can be seen in FIG. 1, hot cement kiln/preheater tower gases ($\approx$400° C.) must be cooled to around 150° C. to have acceptable particulate emissions of <50 mg/nm$^3$ from an ESP.

The pollution control system shown in FIG. 2 is representative of a modern, energy-efficient air pollution control system for a cement plant with an ESP that addresses the problem of meeting stringent air pollution control regulations for particle emissions. As shown in FIG. 2, in a modern pollution control system for a cement plant, hot gases from a preheater tower (not shown) enter a gas conditioning tower (GCT) 10. (The gas flow entering GCT 10 is shown schematically by flow arrow 15.) Gases entering the GCT may be as hot as 400° C. Nozzle means 50 located within GCT 10, near the entrance thereto, inject a spray of cooling liquid into the hot gas flow in the tower. As depicted, nozzle means 50 preferably comprises a plurality of individual nozzles 55, in order to ensure that the injected spray is evenly distributed into the gas flow, thereby promoting uniform cooling. Preferably, individual nozzles 55 are two-fluid nozzles connected by supply pipes 56 and 57 to a source of water and compressed air, respectively. The flow of water and air to the nozzles is modulated by valves 58 and 59, respectively. Valves 58 and 59 are controlled by logic and control system 60 to maintain a spray of desired characteristics. Logic and control system 60 preferably is also used to monitor various system parameters and to adjust the spray as conditions change. As is known in the prior art, for example, a temperature sensor 70 may be placed near the exit of GCT 10 to monitor the temperature of the gas flow leaving the GCT. Logic and control system 60 uses the information from the temperature sensor 70 to determine whether the temperature leaving GCT 10 is within a desired target range. If the temperature is outside of the target range, logic and control system 60 responds by adjusting the spray accordingly. Other sensors may also be employed and connected to the logic and control system, such as sensors (not shown in FIG. 1) for measuring the temperature of gases flowing into GCT 10.

Gases exit GCT 10 via outlet 80 preferably flow into a raw feed mill 20 to help dry and preheat the wet limestone used in the cement plant, and then on to electrostatic precipitator (ESP) 30. However, during a raw mill upset or when the raw feed mill is not in operation, gases flow directly from GCT 10 to ESP 30 as shown by flow arrow 40. After leaving ESP 30, the gases are exhausted into the atmosphere via stack 90. The gases are propelled through the air pollution control system using fans 101 and 102.

The spray characteristics of the two-fluid nozzles 55 can be altered by adjusting the pressure of compressed air and water supplied to the nozzle. In particular, both the quantity of water and the mean size of the water droplets exiting the nozzle may be controlled. A two-fluid nozzle, such as the MICROMIST™ nozzle manufactured by EnviroCare International Inc., has spray characteristics that can be adjusted. Typically, the droplet size is adjusted such that the droplets totally evaporate before they exit the GCT, while the quantity of water is adjusted to achieve the desired gas output temperature (e.g., 250° C. for mill-on and 150° C. for mill-off conditions).

Under normal operating conditions, the gases in the system are directed to raw feed mill 20; (this condition will be referred to as the "mill-on" condition). As noted above, the feed stock in feed mill 20 is cool and wet, and presents a relatively large surface area to the hot gases entering the feed mill. Thus, as hot gases from GCT 10 pass through the feed mill they are further cooled and moisturized.

While the pollution control system of FIG. 2 is an example of a modern pollution control system that is effective at removing common particulates, it does not address the problem of reducing the concentrations of acidic forming gases, such as sulfur dioxide and hydrogen chloride, in the gaseous effluent stream.

As shown in FIG. 3, the present invention generally may be used in connection with a modern pollution control system (as previously described with reference to FIG. 2) with an additional slurry source 61 and a controllable slurry injector 62 to add a controlled quantity of slurry to the liquid sprayed from nozzles 55. Injector 62 receives inputs from logic and control system 60. The slurry source could comprise dry alkaline earth materials, such as hydrated lime, having a small particulate size. Commercially available sources of fine dry hydrated lime may be produced by a variety of methods, such as those produced according to the method of U.S. Pat. No. 5,233,239. Commercially available sources of fine dry particles of hydrated lime commonly have particle sizes on the order of ten microns, which results in a large surface area for chemical reactions. However, commercially available sources of dry particles of chemically active hydrated lime are comparatively expensive. Hydrated lime particles with a 10 micron particle diameter typically cost approximately $200 per ton. However, shipping costs may also be substantial, particularly in remote locations. Fine, dry hydrated lime particles also have the disadvantage that they must be stored in an inert environment until they are used because of the high chemical reactivity of the hydrated lime. Specifically, atmospheric carbon dioxide readily reacts with hydrated lime to form calcium carbonate, according to the expression: $Ca(OH)_2 + CO_2 \rightarrow CaCO_3(s) + H_2O(l)$. This reaction is undesirable because calcium carbonate is comparatively unreactive with acidic forming gases.

According to the present invention, slurry source 61 comprises an in-line wet-grinder to convert a typical slaked lime slurry into a hydrated lime slurry with a controlled fine particle size. Pebble lime, which consists of coarse, pea-sized particles of CaO, is a comparatively inexpensive and widely available source of CaO. Pebble lime can be obtained from a wide variety of sources, typically at a cost of approximately $60–$80 per ton. The pebble lime may be stored under atmospheric conditions until it is slaked and ground. Only a thin "skin" at the surface of the pebble lime is able to react with atmospheric carbon dioxide to form calcium carbonate. The lime in the interior of the pebble lime is protected and retains its chemical reactivity until it is slaked and ground. On-site grinding of slaked lime or coarse hydrated lime offers an economical means to create the slurry source 61 of chemically reactive hydrated lime with a small particle size. Those skilled in the art are familiar with combinations of slakers, mills, and classifiers or hybrid mills that perform a classification function simultaneously with the milling or grinding function. Commercially available slakers, grinders, and classifiers are capable of economically producing large quantities of slaked, ground pebble lime with particles having a controlled mean diameter in the range of one micron to twenty-five microns. Preferably, the lime is slaked and then ground in a wet grinding process such that the ground hydrated lime particles are not exposed to atmospheric gases, such as carbon dioxide. A suitable wet grinder is sold under the trademark VERTIMILL™, produced by Svelda Industries, Inc., York, Pa. Such wet grinders can be used to produce a slurry with a controlled particle size with particle sizes in the range of one micron to twenty-five microns. Smaller particle sizes typically require increased consumption of energy and result in a lower throughput.

Ground hydrated lime particles with a large surface-to-volume ratio (e.g., particles with a mean diameter of less than twenty-five microns) react rapidly with air. Preferably, according to the present invention the slurry is maintained in an inert ambient environment, such as a sealed or nitrogen purge storage tank. If the slurry is stored in an inert ambient environment, it may be stored for relatively short periods (e.g., less than 24 hours) without substantially decreasing its chemical reactivity. Preferably, however, the slurry is prepared substantially as needed using an in-line grinder 63 (shown in FIG. 6) as the slurry source 61 to ensure the highest chemical reactivity of the ground hydrated lime particles in the slurry. Experiments by the inventor indicate that fine particles of hydrated lime can rapidly lose their chemical reactivity if care is not taken to limit potential exposure of the fine particles to carbon dioxide. The inventor believes that stringent processing conditions (e.g., reduced exposure to carbon dioxide using the above-described techniques) are required to maintain the chemical reactivity of fine hydrated lime particles (e.g., hydrated lime particles with a diameter less than 25 microns) because of the large surface-to-volume ratio of fine hydrated lime particles.

As previously described in regards to FIG. 2, in the present invention the spray from the nozzles 55 is adjusted by logic and control system 60 to achieve the desired cooling function (e.g., reducing the gas temperature from 400° C. to 150° C. for the mill-off condition). In one embodiment of the present invention, the mean diameter of the spray droplets is selected to have a diameter of 120 to 150 microns such that the droplets completely evaporate a comparatively short distance prior to the exit of the GCT. The mean lifetime of the spray droplets is thus typically slightly less than the transit time of gases through the GCT.

It is also desirable to prevent plant shutdowns caused by clogged or damaged nozzles and pipes. Preferably, the nozzles are adapted to be chemically resistant to the slurry and further adapted to prevent clogging. The pluggage of nozzles will depend upon the concentration and size of lime particles in the slurry. Preferably, the concentration of lime particles is kept as low as possible consistent with the desired scrubbing function. It is also desirable to prevent the scaling of pipes. The solubility of a lime slurry decreases with temperature. This can result in scaling of pipes through which slurry is transported if the temperature of such pipes substantially increases in the GCT. Preferably, the temperature of pipes transporting slurry in the GCT is maintained at a low enough temperature such that scaling is substantially prevented. One technique to prevent scaling is to use jacketed lances to provide a means to cool pipes transporting slurry by flowing air or water through interior of the jacketed lances.

According to the present invention, the cooling spray of a GCT can be modified to efficiently scrub acidic forming gases using comparatively small amounts of an inexpensive alkaline earth material, such as a hydrated lime slurry. As is well known to those skilled in the art of chemistry, alkaline earth chemicals may react with acidic gases to form thermally stable salts such that the acidic gas components are captured. However, an alkaline earth slurry would ordinarily not be expected to be a cost-effective, efficient means to scrub acidic gases in a GCT used in a cement plant. The evaporative lifetime of a spray droplet in a modern GCT used in a cement plant is commonly about three seconds, although it may vary from one-to-five seconds. This is a relatively short time period for acidic gases to adsorb to the surface of a droplet, be absorbed into the droplet, and react with calcium hydroxide released from the slurry particles in the droplet. Moreover, in order for the reaction to be rapid and efficient, the hydrated lime particles suspended in the spray droplets should substantially dissolve during the transit time of the droplet.

According to the present invention, the spray liquid in a conventional GCT can be modified to perform an efficient scrubbing function. As is known, the total quantity of spray is kept as low as possible in a GCT and the evaporative lifetime is short. In order for the spray in a GCT to perform an efficient chemical scrubbing function the individual droplets should 1) rapidly adsorb pollutant gases; 2) pollutant gases should be rapidly absorbed by the droplet; and 3) chemical agents in the droplets should rapidly scrub (e.g., react with) the deleterious gases in the GCT. Additionally, chemical scrubbing agents and reacted products should otherwise be compatible with the economic operation of a cement plant. It is desirable that the cost of the chemical scrubbing agent should be low and the chemical scrubbing agent and reacted products not damage or clog pipes, valves, or fittings in the cement plant. It is also desirable that the scrubbing chemical not contaminate the feed meal or deleteriously alter the alkali balance of the feed meal.

Several aspects of the present invention make an efficient scrubbing process using an alkaline earth material feasible. First, the present invention utilizes a two-fluid nozzle. Modem two-fluid nozzles, such as the MICROMIS™ nozzle, are capable of substantial control of median droplet size and with a narrow distribution in droplet size (by adjusting the compressed air pressure). The use of such a two-fluid nozzle facilitates an efficient scrubbing process because: 1) the initial surface-to-volume of the droplets is large such that the adsorption of gases is rapid; 2) each droplet has substantially the same initial diameter and hence substantially the same quantity of slurry particles, which facilitates uniform chemical reaction dynamics in the droplets; and 3) each droplet will have a similarly large lifetime (typically one-to-five seconds), since the median droplet size is selected such that the droplets evaporate proximate to the exit of the GCT. Second, the present invention uses a finely ground hydrated lime that is highly reactive. A finely ground hydrated lime with a mean diameter in the range of one-to-twenty-five microns is highly chemically reactive, in large part because it has an extremely large surface area relative to its volume. The large surface-to-volume ratio of the hydrated lime particles increases the rate at which calcium hydroxide dissolves in the spray droplets. Decreasing the mean diameter of the hydrated lime particles substantially below 25 microns facilitates faster dissolution of the hydrated lime particles. According to the present invention, the release of calcium hydroxide from the dissolving hydrated lime particles preferably occurs at a rapid enough rate that it does not limit the reaction that converts absorbed acidic gases into salts. A scrubbing process is likely to achieve a low molar ratio of calcium to sulfur if hydrated lime particles from the injected slurry substantially dissolve in the droplets before the droplets evaporate. For common OCT evaporative lifetimes of one-to-five seconds, the hydrated lime particles preferably have a mean diameter between one-to-ten microns such that the hydrated lime particles substantially dissolve in spray droplets in the GCT.

Preferably, the spray droplet size is selected to achieve a high collection efficiency. However, there are tradeoffs between the surface area of spray droplets and their evaporative lifetime. GCTs used in cement plants typically use spray flow rates corresponding to about one gallon per minute (GPM) per 1000 standard cubic feet per minute (SCFM) of effluent gas flow (0.1 kilogram of liquid per kilogram of gas). For a constant quantity of spray liquid, decreasing the spray droplet size increases the initial surface area of the droplet but also decreases the evaporative lifetime of the droplets. For example, for plant conditions corresponding to the mill-off state, spray droplets with an initial diameter of 250 microns have an evaporative lifetime of about 5 seconds. By way of comparison, if the same quantity of liquid is sprayed as droplets having an initial diameter of 50 microns, the surface area increases by a factor of 25. However, the evaporative lifetime in the mill-off state for droplets having an initial diameter of about 50 microns is reduced to less than one second. Smaller spray droplets have a larger surface area to adsorb gases but have a comparatively shorter evaporative lifetime for chemical reactions to occur inside the droplet.

One important variable in deciding how much lime slurry to inject is related to the spray characteristics (droplet size and total quantity of liquid sprayed) which is also a function of operational state (mill-on or mill-off). The pH should be selected such that salts are formed at a rapid rate in the spray. A high pH (e.g., greater than 12) increases the solubility of acidic gases in the droplets. Preferably, the spray is a saturated lime solution with a pH approaching a saturation limit of about 12.4.

In cement plant applications a high pH is also desirable because it reduces the solubility of ammonia in spray droplets. In cement plants the absorption of ammonia is undesirable, because ammonium sulfate salts are not thermally stable at common GCT temperatures (e.g., greater than 235° C.). Any ammonium sulfate formed in a droplet will decompose when the droplet evaporates, re-releasing ammonia and sulfur dioxide. This reduces the efficiency of the reactions that convert acidic gases into thermally stable salts. The efficiency of the scrubbing process thus increases when the quantity of lime slurry is increased such that the droplets retain a high pH during their evaporative lifetime in the GCT.

The dependence of sulfur dioxide collection efficiency as a function of lime particle size in a gas cooling tower has been experimentally measured by the inventor. The experimental techniques to measure sulfur dioxide collection efficiency are well known to those skilled in the art. FIG. 4 is a plot of sulfur dioxide collection efficiency versus the molar ratio of calcium to sulfur. As shown in FIG. 4, there is strong dependence of sulfur dioxide collection efficiency on the lime particle size. The experimental conditions correspond to 257,800 kg/hr of hot gases with 56 kg/hr of sulfur. The input temperature of the gas was 375° C. The spray characteristics were adjusted to achieve an output temperature 140° C. and an evaporative lifetime of approximately 3 seconds. The collection efficiency was calculated for hydrated lime particles with a diameter of 3 microns, 10 microns, and 30 microns. The collection efficiency rises with increasing calcium to sulfur ratios (e.g., a higher concentration of slurry) but tends to plateau at high calcium to sulfur ratios. A collection efficiency of 90% can be achieved with a calcium to sulfur molar ratio of one for the 3 micron diameter lime particles. This means that a comparatively small quantity of hydrated lime may be used to efficiently scrub sulfur dioxide. This reduces operating costs and helps prevent clogging and plugging of valves and nozzles.

The above-described experiment was also performed under identical conditions except with the spray characteristics adjusted to achieve an evaporative droplet lifetime of approximately two seconds. As shown in FIG. 5, the plot of calculated sulfur dioxide collection efficiency versus calcium to sulfur molar ratio are strongly dependent on the size of the lime particles and the calcium to sulfur ratio. However, the collection efficiency is reduced slightly compared to the case where the evaporative droplet lifetime is three seconds.

The present invention permits sulfur dioxide to be efficiently scrubbed using a relatively small quantity of lime. The inventor attributes the very high efficiency of the present invention to the small size of the hydrated lime particles and the comparatively small size of the spray droplets. The spray droplets preferably have an initial mean diameter less than 200 microns such that they have a large enough surface area to adsorb a large load of acidic gases during their evaporative lifetime. Additionally, the hydrated lime particles have a large enough surface-to-volume ratio that they can rapidly release the calcium and hydroxide ions in the spray droplets. The high collection efficiency and low molar ratios of hydrated lime to sulfur dioxide that has been demonstrated indicate that fine particles of lime (e.g., particles with a mean diameter less than 5 microns) substantially dissolve in the spray droplet during the two-to-three second evaporative lifetime of spray droplets.

Although only experimental results for sulfur dioxide collection efficiency have been determined, similar behavior is expected for other acidic forming gases, such as hydrogen chloride. The large surface-to-volume ratio of the spray droplets and the lime particles favor the rapid absorption and conversion of other acidic-forming gases into thermally stable salts.

Other variations on the present invention are also possible. In particular, chemical sensors 120 could be added at various sites in a cement plant to measure levels of sulfur dioxide. The slurry quantity or the properties of the slurry (e.g., particle size) could be adjusted in response to information from the chemical sensors 120 to maintain the emissions within acceptable limits.

The present invention has been described in detail for a hydrated lime slurry. However, those skilled in the art are familiar with other alkaline earth materials that form salts with acidic forming gases. Those skilled in the art are also familiar with techniques, such as using a slaker, grinder classifier, and mixer to make a slurry source comprised of small diameter alkaline earth particles of other compounds.

The present invention has also been described in detail for the GCT used in a cement plant. However, those skilled in the art of pollution control are familiar with other applications where a spray with an injected alkaline slurry could be used to scrub acid forming gases. For example, the spray nozzles, slurry source, slurry injector, and controller of the present invention do not necessarily have to be disposed in a GCT of a cement plant. The teachings of the present invention could be applied to scrubbing sprays used in a wide variety of applications where it is desirable to efficiently collect sulfur dioxide and other acid forming gases using a spray composed of a liquid and a hydrated lime slurry. However, if the droplets do not completely evaporate in the pollutant stream the effective lifetime of a spray droplet may more properly be defined by a mean transit lifetime in the gaseous effluent stream.

While the present invention has been described with reference to the specific embodiments and elements disclosed, it is understood that other, equivalent embodiments of the invention are possible, and that the practice of the invention is not intended to be limited solely to those embodiments disclosed in this application.

What is claimed is:

1. A method of treating a flow of gas containing acid-forming vapors using a cooling liquid in a gas cooling tower, the gas cooling tower having at least one spray nozzle to provide a cooling spray and having a slurry injector to inject slurry into the liquid before it is sprayed, comprising the steps of:

a) providing a hydrated lime slurry source to form a slurry with a controlled mean particle diameter;

b) adjusting spray characteristics of the spray nozzle to provide the required cooling in the gas cooling tower, the spray characteristics selected so that the spray droplets have a mean evaporative lifetime selected such that said spray droplets evaporate in the cooling tower;

c) selecting the mean particle diameter of the lime slurry so that the lime particles substantially dissolve in the spray droplets during the evaporative lifetime of the spray droplets; and d) selecting the injection rate of the slurry injected into the spray;

wherein the mean spray droplet diameter is selected to be in the range of 50 to 250 microns and the mean lime particle diameter is selected to be less than 25 microns to increase the rate at which calcium hydroxide is released from said particles in said spray droplets.

2. The method of claim 1, wherein the mean particle diameter of said lime slurry is about 10 microns or less.

3. The method of claim 2, wherein the mean particle diameter of said lime slurry is about 5 microns or less.

4. The method of claim 2, wherein the evaporative lifetime of said spray droplets is less than about five seconds.

5. The method of claim 1, wherein the slurry characteristics and slurry injection rate are selected so that the spray droplets are initially composed of a saturated calcium hydroxide solution with a sufficient initial quantity of undissolved hydrated lime particles so that the spray droplets retain a pH greater than 12.0 throughout the evaporative lifetime of the droplets.

6. The method of claim 1, wherein said hydrated lime slurry source comprises an in-line wet grinder to grind coarse particles of lime.

7. The method of claim 6, wherein said wet grinder provides particles in a desired size range.

8. The method of claim 1, wherein the mean spray droplet diameter is selected to be less than about 200 microns.

9. The method of claim 1, wherein the mean evaporative lifetime of the spray droplets is less than about five seconds.

10. The method of claim 1, wherein the mean evaporative lifetime of the spray droplets is less than about 5 seconds and the mean particle diameter of the hydrated lime particles is selected to be about 10 microns or less.

11. The method of claim 10, wherein the mean particle diameter is about 3 microns or less.

12. A method of using a liquid cooling spray to scrub effluent gases in an air pollution control system, the method comprising the steps of:

selecting a liquid flow rate to produce a spray having a sufficient quantity of liquid to provide a desired amount of cooling when all of the liquid is evaporated;

selecting a mean diameter of the spray droplets between 50 to 250 microns, said spray droplets having a mean evaporative lifetime less than about five seconds;

injecting a controlled flow rate of a lime slurry composed of hydrated lime particles into the cooling liquid to be sprayed; and injecting the cooling liquid into the effluent gases so that any acidic components in said effluent gases react with the hydrated lime in the cooling liquid, wherein the mean particle diameter of said hydrated lime particles is selected to be less than about 10 microns.

13. The method of claim 12, wherein said mean particle diameter is about five microns or less.

14. The method of claim 12, wherein said mean evaporative lifetime is about 3 seconds or less and said mean particle diameter is about 3 microns or less.

15. The method of claim 12, further comprising the step of: in-line grinding of coarse lime particles to form the lime slurry.

16. The method of claim 15, wherein an in-line wet grinder which provides particles in a desired size range is used to grind the lime.

17. A method of using a liquid cooling spray to scrub effluent gases in an air pollution control system, the method comprising the steps of:

selecting a liquid flow rate to produce a spray having a sufficient quantity of liquid to provide a desired amount of cooling when all of the liquid is evaporated;

selecting a mean diameter of the spray droplets between 50 to 250 microns, said spray droplets having a mean evaporative lifetime less than about five seconds;

injecting a controlled flow rate of a slurry of one or more alkaline earth compounds into the cooling liquid to be sprayed;

injecting the cooling liquid into the effluent gases so that any acidic components in said effluent gases react with the alkaline earth compounds in the cooling liquid;

wherein the mean particle diameter of the particles in said slurry is selected to be less than about 10 microns.

* * * * *